(12) United States Patent
Zhu et al.

(10) Patent No.: US 12,007,268 B2
(45) Date of Patent: Jun. 11, 2024

(54) FLOW MEASURING DEVICE HAVING A FIRST AND A SECOND FLOW MEASURING TRANSDUCER OPERATING ON DIFFERENT OPERATING PRINCIPLES FOR IMPROVED MEASUREMENT ACCURACY

(71) Applicant: Endress+Hauser Flowtec AG, Reinach (CH)

(72) Inventors: Hao Zhu, Freising (DE); Wolfgang Drahm, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 404 days.

(21) Appl. No.: 17/298,050

(22) PCT Filed: Oct. 31, 2019

(86) PCT No.: PCT/EP2019/079887
§ 371 (c)(1),
(2) Date: May 28, 2021

(87) PCT Pub. No.: WO2020/108910
PCT Pub. Date: Jun. 4, 2020

(65) Prior Publication Data
US 2022/0099470 A1    Mar. 31, 2022

(30) Foreign Application Priority Data
Nov. 28, 2018    (DE) ..................... 10 2018 130 182.0

(51) Int. Cl.
*G01F 7/00*    (2006.01)
*G01F 1/34*    (2006.01)
*G01F 1/84*    (2006.01)

(52) U.S. Cl.
CPC ................ *G01F 7/005* (2013.01); *G01F 1/34* (2013.01); *G01F 1/84* (2013.01); *G01F 7/00* (2013.01)

(58) Field of Classification Search
None
See application file for complete search history.

(56) References Cited

U.S. PATENT DOCUMENTS

| | | |
|---|---|---|
| 2002/0183941 A1 | 12/2002 | Cunningham et al. |
| 2003/0167836 A1 | 9/2003 | Mattar |

(Continued)

FOREIGN PATENT DOCUMENTS

| | | |
|---|---|---|
| CN | 102686986 A | 9/2012 |
| CN | 102753946 A | 10/2012 |

(Continued)

*Primary Examiner* — Jamel E Williams
(74) *Attorney, Agent, or Firm* — Mark A. Logan; Endress+Hauser (USA) Holding, Inc.

(57) ABSTRACT

A method for determining a flowed amount of a medium includes using a first flow measuring transducer according to a first measuring principle and a second flow measuring transducer according to a second measuring principle. The measured values of the first transducer are more reliable in first states of the medium than measured values of the second transducer, and the second measured values are more reliable in second states than the first measured values. A contribution to the flowed amount is ascertained based on the more reliable measured values. The contribution to the flowed amount based on the second measured values is ascertained via a transfer function. An updated version of the transfer function is ascertained when the first measured values are more reliable, and the flowed amount earlier ascertained based on the second measured values is corrected as a function of the updated transfer function.

12 Claims, 4 Drawing Sheets

(56) References Cited

U.S. PATENT DOCUMENTS

| | | | |
|---|---|---|---|
| 2007/0084298 A1* | 4/2007 | Rieder | G01F 1/8404 |
| | | | 73/861.356 |
| 2011/0161017 A1 | 6/2011 | Kumer et al. | |
| 2012/0055263 A1* | 3/2012 | Konzelmann | G01F 1/34 |
| | | | 73/861.18 |
| 2014/0136125 A1 | 5/2014 | Agar et al. | |

FOREIGN PATENT DOCUMENTS

| | | |
|---|---|---|
| DE | 19814972 A1 | 10/1999 |
| DE | 102005046319 A1 | 3/2007 |
| DE | 102007062908 A1 | 6/2009 |
| DE | 102016011256 A1 | 3/2018 |
| JP | 06174517 A | 6/1994 |

\* cited by examiner

FLOW MEASURING DEVICE HAVING A FIRST AND A SECOND FLOW MEASURING TRANSDUCER OPERATING ON DIFFERENT OPERATING PRINCIPLES FOR IMPROVED MEASUREMENT ACCURACY

CROSS-REFERENCE TO RELATED APPLICATIONS

The present application is related to and claims the priority benefit of German Patent Application No. 10 2018 130 182.0, filed on Nov. 28, 2018 and International Patent Application No. PCT/EP2019/079887, filed on Oct. 31, 2019, the entire contents of which are incorporated herein by reference.

TECHNICAL FIELD

The present invention relates to a method for determining a flowed amount of a flowable medium, which has flowed through a measuring station, wherein the measuring station includes a first flow measuring transducer, which works according to a first measuring principle and a second flow measuring transducer, which works according to a second measuring principle, wherein the two flow measuring transducers are adapted, in each case, to be exposed to the total flowed amount of the medium, wherein the flowing medium has variable states or combinations of states, which influence reliability of first measured values of the first flow measuring transducer differently than second measured values of the second flow measuring transducer; wherein the first measured values of the first flow measuring transducer are more reliable in first states or combinations of states of the medium than the second measured values of the second flow measuring transducer, and the second measured values of the second flow measuring transducer are more reliable in second states or combinations of states of the medium than the first measured values of the first flow measuring transducer. Furthermore, the invention relates to a measuring station for performing the method.

BACKGROUND

In a method of the field of the invention disclosed, for example, in Offenlegungsschrift DE 10 2005 046 319 A1, a contribution to the flowed amount is ascertained based on the first measured values, when these are more reliable, wherein the second measured values are used, when these are more reliable, wherein the contribution to the flowed amount corresponding to the second measured values is ascertained by means of a transfer function based on the second measured values.

SUMMARY

It is an object of the present invention to provide a method with improved accuracy of measurement and a measuring station for performing the method.

The method of the invention serves for determining a flowed amount of a flowable medium, which has flowed through a measuring station, wherein the measuring station includes a first flow measuring transducer, which works according to a first measuring principle and a second flow measuring transducer, which works according to a second measuring principle, wherein the two flow measuring transducers are adapted, in each case, to be flowed through by the total flowed amount of the medium, wherein the flowing medium has variable states or combinations of states, which influence reliability of first measured values of the first flow measuring transducer differently than second measured values of the second flow measuring transducer; wherein the first measured values of the first flow measuring transducer are more reliable in first states or combinations of states of the medium than the second measured values of the second flow measuring transducer, and the second measured values of the second flow measuring transducer are more reliable in second states or combinations of states of the medium than the first measured values of the first flow measuring transducer; wherein a contribution to the flowed amount is ascertained based on the first measured values, when these are more reliable, wherein the second measured values are used, when these are more reliable, wherein the contribution to the flowed amount corresponding to the second measured values is ascertained based on the second measured values by means of a version of a transfer function valid at the point in time of ascertaining the second measured values, wherein an updated version of the transfer function is ascertained, when the measured values of the first flow measuring transducer are more reliable, wherein the contribution to the flowed amount earlier ascertained based on the second measured values is subsequently corrected as a function of the updated transfer function.

The method of the invention can especially be applied for the fueling of ships, so-called bunkering, where especially a certifiable registering of an amount of fuel flowed through the measuring station is required, since the registered amount of fuel forms the basis for payment.

In an additional development of the invention, the first flow measuring transducer comprises a mass flow measuring transducer, which registers mass flow rate measured values as first measured values; wherein the second flow measuring transducer comprises a pressure difference measuring transducer, wherein the second measured values comprise pressure difference values, based on which mass flow rate measured values are ascertained by means of the transfer function.

Although mass flow measuring transducers have an outstanding accuracy of measurement and reliability in the case of single phase media, or liquids of low gas content, this can be degraded by higher gas contents. In such case, flow measurement based on pressure difference proves to be a more robust alternative. For an improved accuracy of measurement, the transfer function is continuously updated, when the two measuring principles are combined. Investigations in connection with the present invention have shown that it is worthwhile to check the validity of the most recent transfer function directly after its application and, in given cases, subsequently to correct the flowed amount ascertained based on the transfer function.

In an embodiment of this additional development of the invention, the transfer function is further proportional to a constant C1, which is ascertained empirically in the case of updating of the transfer function.

In an embodiment of this additional development of the invention, the transfer function is proportional to a first term of the form $|dp|^{1/C3}$, wherein dp is the measured pressure difference, wherein C3 is a constant, which has a value between 1.5 and 2.5, especially between 1.75 and 2.25.

In an embodiment of this additional development of the invention, the transfer function is further proportional to a second term, which rises with the temperature of the medium, wherein the second term rises especially with declining viscosity of the medium.

In an embodiment of this additional development of the invention, the transfer function F has the form $F(dp, T)=C1\ G(dp)\ H(T)$ or $F(dp, T)=C1\ G(dp,T)$, wherein C1 is a constant, and G and H are functions of the pressure difference dp and/or T.

In an embodiment of this additional development of the invention, the transfer function F has the form $F(dp, T)=C1\ dp^{1/C2}\ \exp(C3\ T)$ or $F(dp, T)=C1\ dp^{1/C2}\ \exp(-C3/T)$, wherein C1, C2, C3 are positive constants.

In an additional development of the invention, for the subsequent correcting of the earlier calculated contribution to the flowed amount ascertained based on the second measured values as a function of the updated transfer function a correction function is used, in which the updated transfer function enters with a weight w and the transfer function applied in the case of the first ascertaining of the contribution enters with a weight (1-w), wherein w≤1, wherein the weight w is especially time dependent and, for example, decreases with time separation between the registering of the second measured values for the contribution to be corrected and the updating of the transfer function.

In an additional development of the invention, the first measured values are evaluated as more reliable, when fluctuation of the first measured values, and/or of an auxiliary measured variable of the first flow measuring transducer, does not exceed a pertinent fluctuation limit value.

In an embodiment of this additional development of the invention, the auxiliary measured variable comprises density of the medium, or an eigenfrequency of an oscillatory mode of the mass flow measuring transducer, viscosity of the medium, or damping of at least one oscillatory mode and/or a signal-noise ratio of at least one oscillation sensor signal of the mass flow measuring transducer.

The measuring station of the invention comprises a first flow measuring transducer, which works according to a first measuring principle; a second flow measuring transducer, which works according to a second measuring principle; and an operating- and evaluating circuit, which is adapted for performing the method of the invention.

BRIEF DESCRIPTION OF THE DRAWINGS

The invention will now be explained in greater detail based on examples of embodiments shown in the drawing. The figures of the drawing show as follows:

FIG. 2b shows a superimposing of the data of FIG. 2a;

FIG. 4b shows a detail view for the example of an embodiment shown in FIG. 4a.

DETAILED DESCRIPTION

Figure 1:
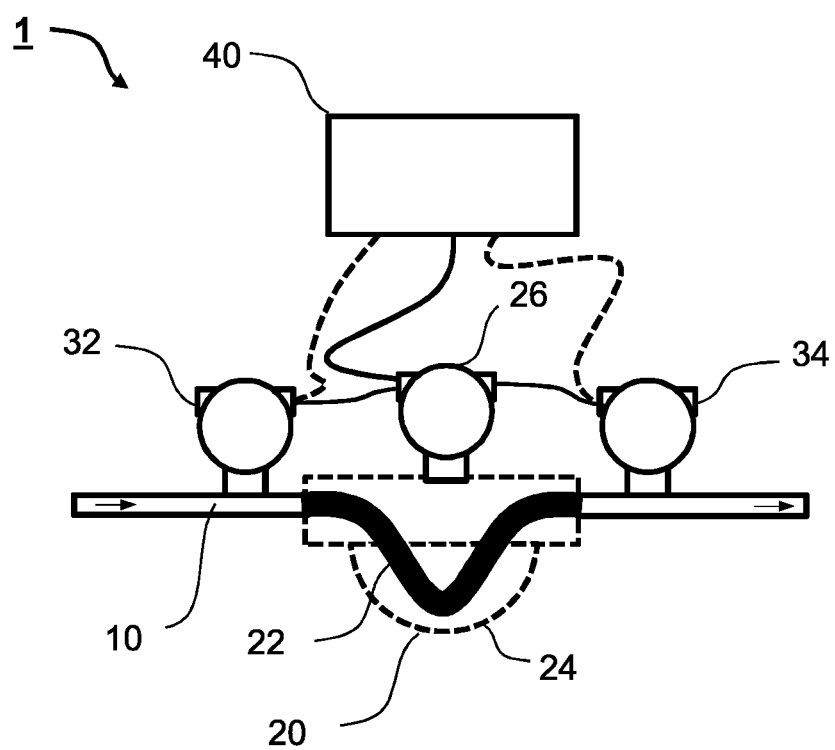
FIG. 1 shows an example of a measuring station for performing the method of the present disclosure.

The example of a measuring station 1 shown in FIG. 1 for performing the method of the invention is arranged in a pipeline 10, in which a medium, especially a fuel, flows. The measuring station 1 includes a Coriolis mass flow measuring transducer 20, which is adapted to register besides mass flow rates also the density of a medium. Such a Coriolis mass flow measuring transducer 20 is produced by the applicant, for example, under the designation Promass F, Promass Q or Promass X. The Coriolis mass flow measuring transducer 20 includes at least one oscillator 22 of two bent, parallel extending, measuring tubes. The measuring tubes are located in a housing 24 and can be excited by the oscillator 22 to execute bending oscillations. The mass flow of the density of the medium can be determined in known manner from the oscillatory behavior of the measuring tubes.

The flow measuring transducer 20 is shown in the drawing with horizontal flow direction and downwards extending measuring tube bend. Of course, the measuring tube bend can for the purpose of improved emptiability also extend upwards. Equally, the flow measuring transducer can even be arranged with vertically extending flow direction. The measuring station 1 includes, additionally, an arrangement for flow rate measurement based on pressure difference, wherein advantageously the Coriolis mass flow measuring transducer 22 is arranged between two pressure measuring points, in order to form a throttle for the pressure difference measurement. In the example of an embodiment, the arrangement includes a first pressure measurement transmitter 32 having a first pressure sensor and a second pressure measurement transmitter 34 having a second pressure sensor, between which the Coriolis mass flow measuring transducer 20 is arranged. The pressure sensors can be absolute- or relative pressure sensors. Instead of the two pressure measurement transmitters, also a single pressure difference measurement transmitter having a pressure difference sensor can be applied, which via differential pressure lines or hydraulic pressure transfer lines, is contactable with pressures in the pipeline 10 at two pressure measuring points, between which the Coriolis mass flow measuring transducer 22 is arranged.

The Coriolis mass flow measuring transducer 20 includes, additionally, a measuring- and operating circuit 26, which is at least adapted to operate the flow measuring transducer 20, to ascertain measured values for the mass flow and, in given cases, the density, and to output ascertained measured values to a superordinated unit 40.

Whether the pressure measurement transmitters 32, 34 are connected directly to the measuring- and operating circuit 26 of the Coriolis mass flow measuring transducer 20 or to the superordinated unit 40, is not important for the invention. It matters only that the required measured variables are registered and brought together for ascertaining the flowed amount.

Figure 2A:
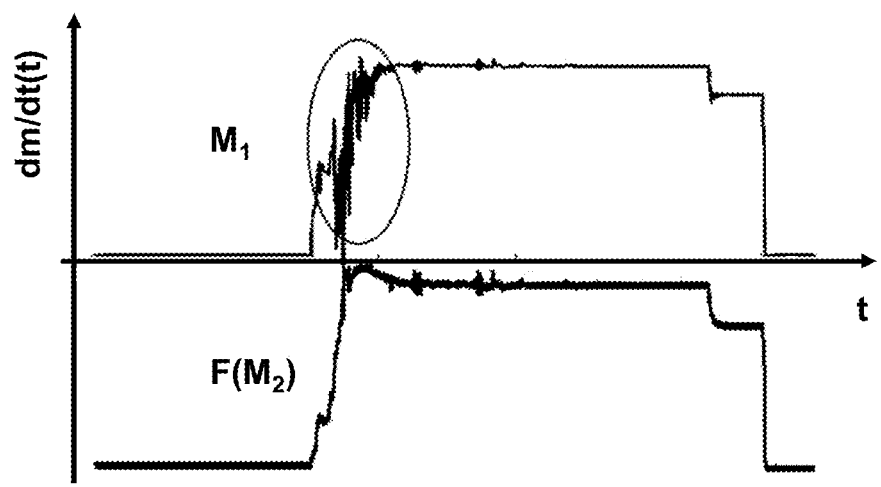
FIG. 2a shows an example of measured mass flow rates $M_1$ and $F(M_2)$, which were registered in the case of fueling a ship.
Figure 2B:
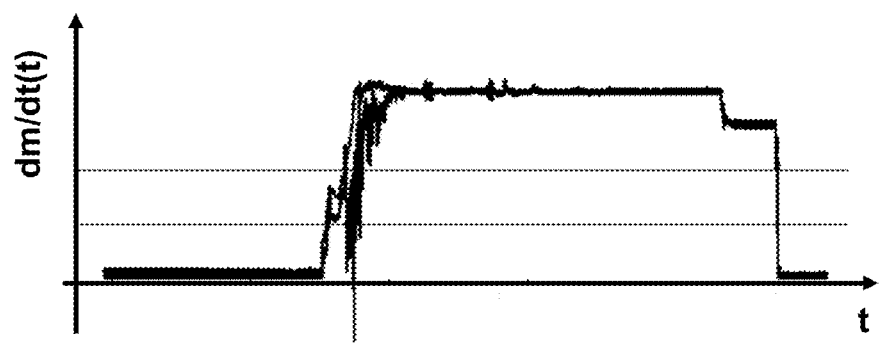

The graphs in FIGS. 2a and 2b show mass flow rate dm/dt(t) as a function of time, which, on the one hand, were registered as first measured values $M_1$ of a Coriolis mass flow measuring transducer and, on the other hand, were calculated as a function $F(M_2)$ of second measured values, wherein the second measured values comprise pressure differences dp between two pressure sensing points of a measuring station of the invention, between which points the Coriolis mass flow measuring transducer is arranged. The measurement data in FIG. 2a are shifted by a constant value, in order that they can be observed separately. The first measurement data $M_1$ exhibit strong fluctuations at the beginning of the filling in a rising edge, which is marked in FIG. 2a with an ellipse. This is a result of a large amount of air inclusions present initially in the fuel. An exact determining of the flowed amount based on the first measurement data in the rising edge is, for this reason, not practical. The values for mass flow rate as a function $F(M_2)$ of the second measured values have, in contrast, in the rising edge a comparatively smooth function of time better suited for ascertaining the flowed amount. In FIG. 2b, the measurement data of FIG. 2a are shown superimposed, which shows that the measurement data are largely congruent. This confirms the approach of the invention of using the first or second measurement data depending on the circumstances, and, in given cases, to update the transfer function F, when one of the measurement data types has a lower reliability.

The manner of proceeding will now be explained in greater detail based on FIG. 3.

Figure 3:
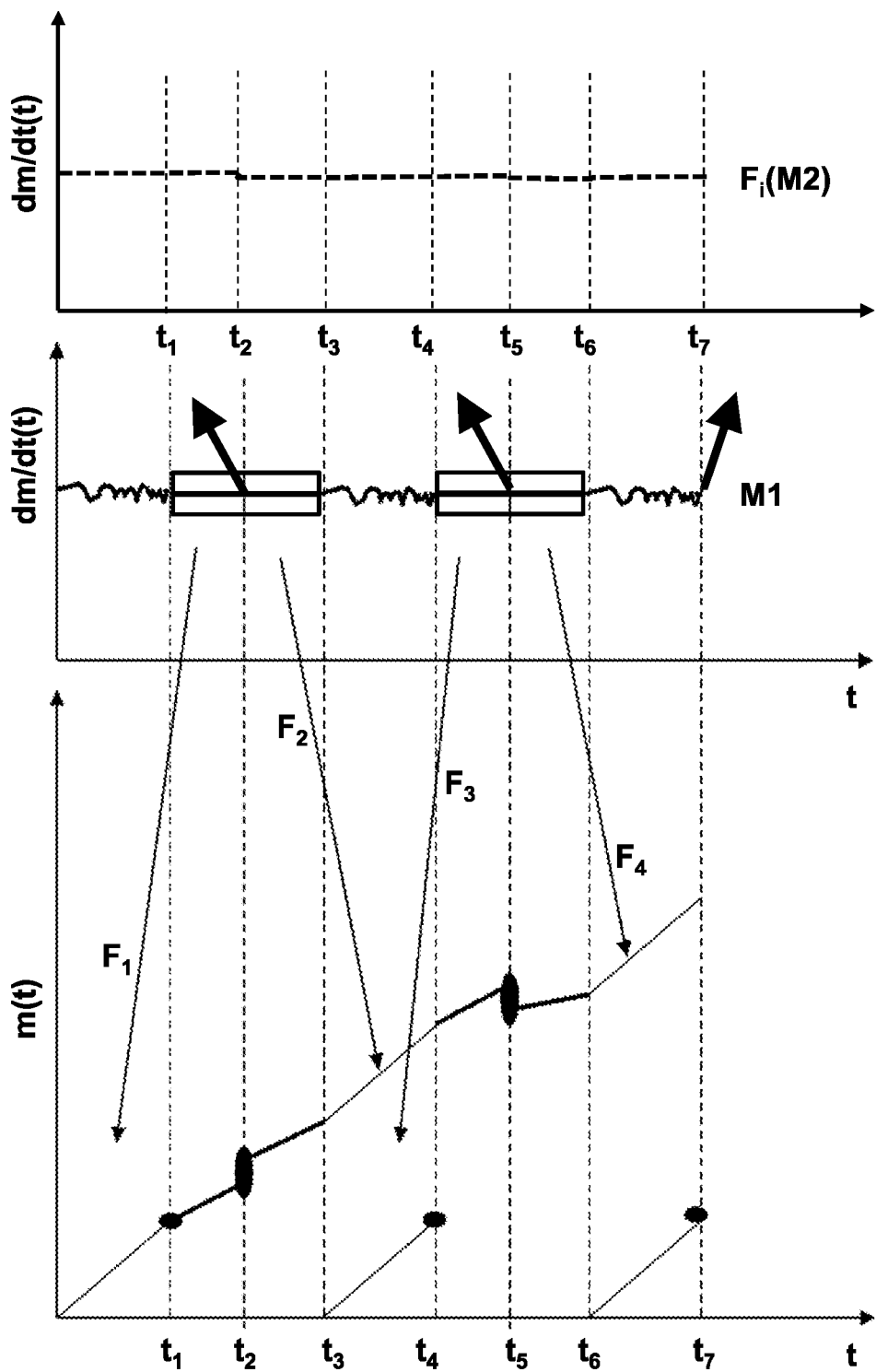
FIG. 3 shows a schematic view for ascertaining a total amount based on first and second measured values.

In the upper portion FIG. 3 are the first measurement data $M_1$, thus, mass flow rates dm/dt(t) of a Coriolis mass flow measuring transducer and mass flow rates dm/dt(t) as a function of second measured values $F_i(M_2)$, wherein the second measured values $M_2$ are pressure difference values. The first measurement data $M_1$ have between the points in time $t_1$ and $t_3$ as well as between $t_4$ and $t_6$ a better reliability compared with the not shown mass flow rates based on the second measurement data $M_2$. Therefore, the determining of the flowed amount between $t_1$ and $t_3$ as well as between $t_4$ and $t_6$ occurs based on the first measured values $M_1$. Moreover, in these intervals, a transfer function, with which the mass flow rates dm/dt(t) corresponding to the second measured values $M_2$ are ascertained, is updated.

Before $t_1$ as well as between $t_3$ and $t_4$, and $t_6$ and $t_7$, the first measured values $M_1$ have such strong fluctuations that at these times the second measured values $M_2$, especially mass flow rate values based on the second measured values $M_2$, are more reliable. Therefore, at these times, the contribution to the flowed amount m(t) is ascertained based on the second measured values $M_2$. At the beginning of the measuring, the most recent transfer function $F_0$ is used, in order to calculate mass flow rates dm/dt(t)=$F_0(M_2)$ from the second measured values $M_2$. These values are integrated over time, or discrete values are summed up, in order to ascertain the total amount m(t) flowed up to the point in time $t_1$. The result is shown in the lower part of FIG. 3.

From the point in time $t_1$, the first measured values $M_1$ are more exact for the mass flow dm/dt(t), so that such are integrated, in order to register the total amount flowed. At the same time, in this time period, the transfer function F is updated, wherein the updated transfer function $F_1$ differs in such measure from the transfer function $F_0$ that at the time $t_2$ a subsequent correction of the total amount m(t) for the time before $t_1$ is performed. Such is indicated by the jump in the function of time m(t). Actually, there occurs a continual updating of the transfer function, by comparing the first measured values $M_1$ with the mass flow rate values based on the second measured values $M_2$, so that at $t_3$, when the first measured values for the next time should not be used, a newly updated transfer function $F_2$ is available. By means of this updated transfer function $F_2$ then the second measured values $M_2$, thus, the pressure difference values, are converted into the corresponding mass flow rates dm/dt(t)=$F_2(M_2)$. When the first measured values are more reliable at $t_4$, the procedure at $t_1$ correspondingly repeats. I.e., the first measured values $M_1$ again form the basis for ascertaining the ongoing contribution to the total amount m(t), the transfer function is updated and, with the updated transfer function $F_3$, the earlier ascertained contribution to the total amount for the time period $t_3$ to $t_4$ is corrected based on the pressure difference measurement. Due to the consecutive updating of the transfer function, $F_3$ is followed by a transfer function $F_4$, which is then available for subsequent calculating of mass flow rates based on the second measured values.

A suitable transfer function F will now be presented. F can be proportional to a constant C1, which, in each case, is ascertained empirically at the updating of the transfer function F.

Theoretically, volume flow, or mass flow, as the case may be, at a pressure difference measuring station is proportional to the square root of the pressure difference dp, thus, dm/dt=K·|dp|$^{1/2}$, wherein K is a factor independent of dp. In practice, however, it has been found that it can be expedient to deviate from the exponent ½. As a result, the transfer function is proportional to a first term of the form |dp|$^{1/C2}$, wherein dp is the measured pressure difference, wherein C2 is a constant, which has a value between 1.5 and 2.5, especially between 1.75 and 2.25. These ranges include, indeed, the theoretical value of C2=2, but provide the possibility of other values. Furthermore, the transfer function should take into consideration temperature of the medium to be filled, since this influences viscosity of the medium, which directly affects the pressure difference measurement. In general, F has, consequently, the form F(dp, T)=C1 L(dp,T), wherein C1 is a constant. Actually, the function L(dp,T) is separable, so that F can be described as $$F(dp,T)=C1 \cdot G(dp) \cdot H(T).$$

The transfer function F can then especially have the form $$F(dp,T)=C1\, dp^{1/C2} \exp(C3\,T) \text{ or}$$

F(dp, T)=C1 dp$^{1/C2}$ exp(−C3/T), wherein C1, C2, C3 are positive constants, which are especially to be ascertained measuring station specifically, or media-specifically.

In an additional development of the invention, for the subsequent correcting of the earlier ascertained contribution to the flowed amount based on the second measured values as a function of the updated transfer function, a correction function is used, in which the updated transfer function enters with a weight w and the transfer function applied in the case of the first ascertaining of the contribution with a weight (1−w), wherein w≤1, wherein the weight w is especially time dependent and, for example, decreases with time separation between the registering of the second measured values for the contribution to be corrected and the updating of the transfer function. For example, w can be given as $$w=((t_{start}(M_2)+t_{stop}(M_2))/2-t(F_{i-1}))/(t(F_i)-t(F_{i-1})),$$

wherein $t_{start}(M_2)$ and $t_{stop}(M_2)$ are the points in time, between which second measured values $M_2$ for the mass flow dm/dt(t) based on pressure difference measurement were used. These points in time lie between the points in time $t(F_i)$ and $t(F_{i-1})$, which, for example, in each case, give an average point in time of the data capturing for ascertaining the updated transfer functions $F_i$ and $F_{i-1}$.

Figure 4A:
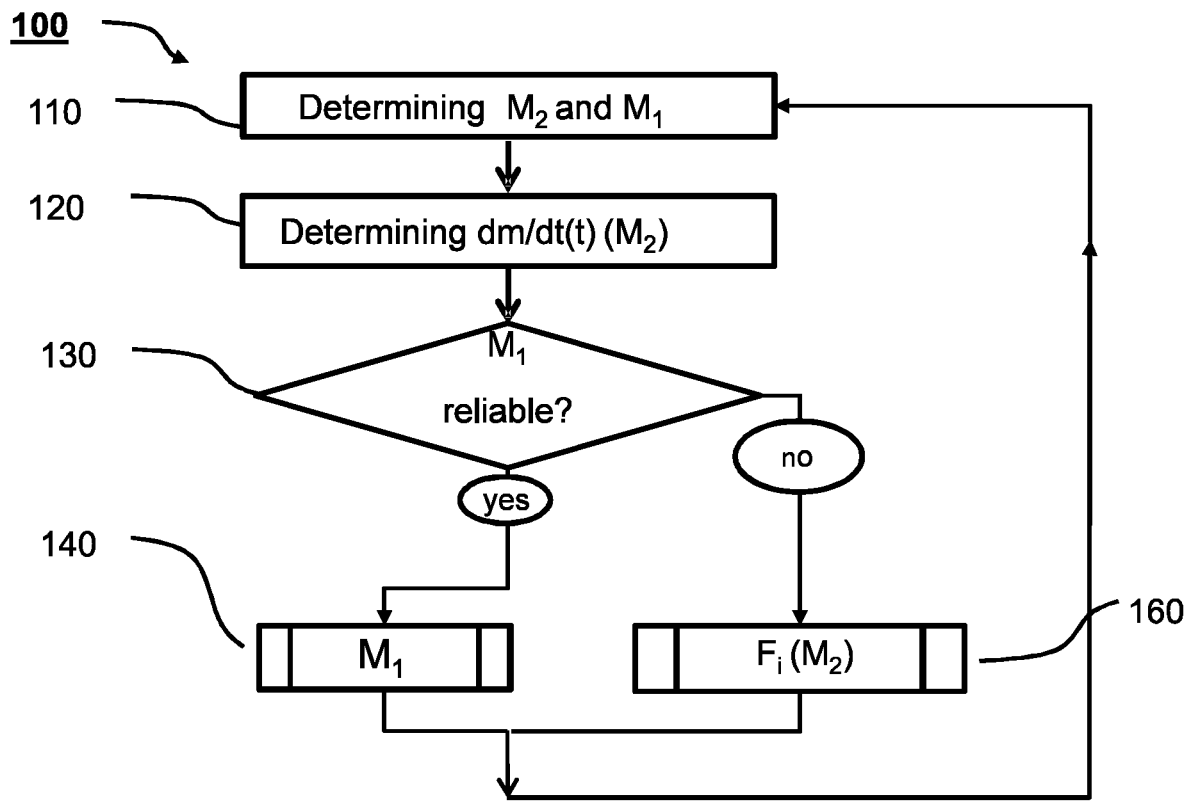
FIG. 4a shows a flow diagram of an example of an embodiment of the method of the present disclosure.

FIG. 4a shows an overview of the method 100 of the invention.

First in a first step 110, the measured variables M1 and M2 are registered with the two measuring transducers, wherein the mass flow rate registered with the Coriolis mass flow measuring transducer forms the first measured variable $M_1$, and the pressure difference registered with the pressure difference measuring transducer forms the second measured variable $M_2$.

In the next step 120, a current mass flow rate dm/dt ($M_2$) is calculated by means of the current transfer function $F_i$ from a measured value M2 in the form of a current pressure difference.

In the next step 130, it is checked whether the first measured variable $M_1$ is reliable. Such can occur, for instance, by evaluation of fluctuations of the first measured variable or other parameters of the Coriolis mass flow measuring transducer, for example, a fluctuation of the density or damping of the oscillations of the oscillator of the Coriolis mass flow measuring transducer. Depending on result of the evaluation, the method includes two alternatives for the next step.

In the case of a positive result, in a first alternative of the method in the next step 140 the first measured values $M_1$ are used for the further ascertaining of the flowed total amount m(t) and the updating of the transfer function.

In the case of a negative result, instead in a second alternative of the method in the next step 160 the mass flow rates are based on the second measured values $M_2$, which are used for the further ascertaining of the flowed total amount m(t) and the updating of the transfer function, thus:

$$m(t)=m(t-\Delta t)+F_i \cdot (M_2)^* \Delta t.$$

Since a new value is ascertained for the total amount m(t), the method begins anew with step 110 for ascertaining first and second measured values.

Figure 4B:
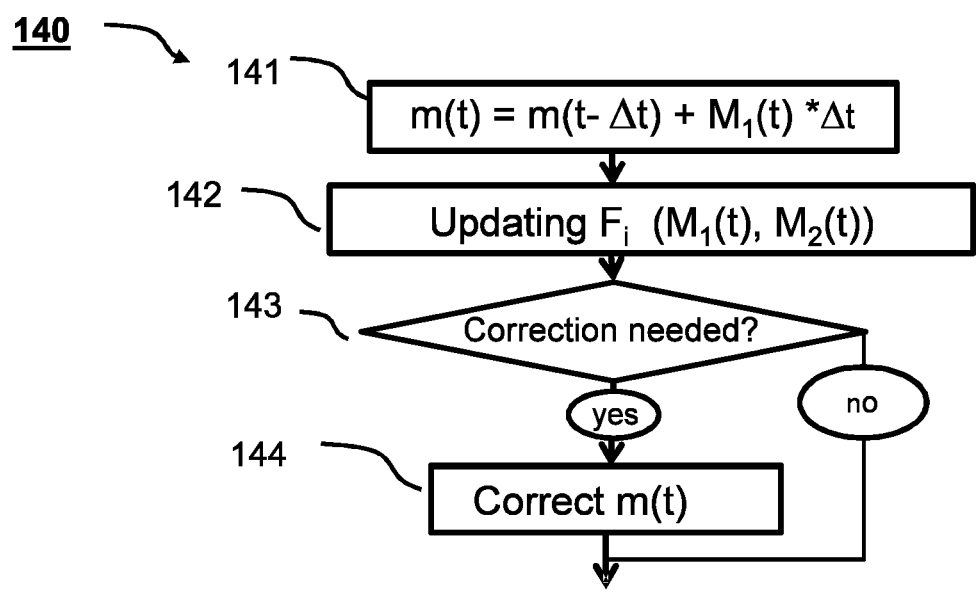

The first alternative 140 of the method includes in particular a plurality of substeps, as shown in FIG. 4b.

First, in a first substep 141, the current mass flow rate dm/dt(t) is multiplied by a time interval $\Delta t$ and added to the preceding value of the total amount m(t−Δt), in order to ascertain a current value for the total amount m(t).

Then, in substep 142, based on the current first measured values $M_1(t)$ and second measured values $M_2(t)$, an updated transfer function $F_i$ is ascertained, i.e., especially the coefficient C1 of the above discussed transfer function is ascertained, or a plurality of coefficients of this transfer function are ascertained, in order that with the updated transfer function $F_i$ current second measured values $M_2$ can be mapped onto current measured values $M_1$.

In a next substep 143, it is checked whether need for correction of the earlier ascertained total amount m(t−Δt) is present. Such is the case, for example, when directly before, the contributions to the flowed total amount m(t) were determined based on the second measured values, and when the transfer function $F_{i-1}$ applied in such case differs from the current transfer function. The earlier calculated contribution to the total amount ascertained based on the second measured values is then corrected by the deviation, or with the above discussed weighting function w.

The invention claimed is:

1. A method for determining a flowed amount of a flowable medium that has flowed through a measuring station, wherein the measuring station includes:
   a first flow measuring transducer that works according to a first measuring principle; and
   a second flow measuring transducer that works according to a second measuring principle,
   wherein the two flow measuring transducers are adapted, in each case, to be exposed to the total flowed amount of the medium,
   wherein the flowing medium has variable states or combinations of states that influence reliability of first measured values of the first flow measuring transducer differently than second measured values of the second flow measuring transducer,
   wherein the first measured values of the first flow measuring transducer are more reliable in first states or combinations of states of the medium than the second measured values of the second flow measuring transducer, and the second measured values of the second flow measuring transducer are more reliable in second states or combinations of states of the medium than the first measured values of the first flow measuring transducer, the method comprising:
   ascertaining a contribution to the flowed amount based on the first measured values when these are more reliable;
   ascertaining a contribution to the flowed amount based on the second measured values when these are more reliable, wherein the contribution to the flowed amount corresponding to the second measured values is ascertained based on the second measured values via a version of a transfer function valid when ascertaining the second measured values;
   updating the transfer function when the measured values of the first flow measuring transducer are more reliable, wherein the updating includes empirically determining a constant C1, wherein the transfer function is proportional to the constant C1, and wherein the transfer function is further proportional to a first term of the form $|dp|^{1/C3}$, wherein dp is a measured pressure difference and C3 is a constant having a value between 1.5 and 2.5; and
   correcting as a function of the updated transfer function the contribution to the flowed amount earlier ascertained based on the second measured values.

2. The method as claimed in claim 1, wherein the first flow measuring transducer incudes a mass flow measuring transducer, and the first measured values include mass flow rate measured values, and wherein the second flow measuring transducer includes a pressure difference measuring transducer, and the second measured values include pressure difference values dp, based on which mass flow rate measured values are ascertained by means of the transfer function.

3. The method as claimed in claim 1, wherein the transfer function is further proportional to a second term that rises with the temperature of the medium.

4. The method as claimed in claim 1, wherein the second term rises with declining viscosity of the medium.

5. The method as claimed in claim 1, wherein, for the subsequent correcting of the earlier calculated contribution to the flowed amount ascertained based on the second measured values as a function of the updated transfer function a correction function is used, in which the updated transfer function enters with a weight w and the transfer function applied in the case of the first ascertaining of the contribution enters with a weight (1-w).

6. The method as claimed in claim 5, wherein w=1.

7. The method as claimed in claim 5, wherein the weight w decreases with time separation between the registering of the second measured values for the contribution to be corrected and the updating of the transfer function.

8. The method as claimed in claim 1, wherein the first measured values are evaluated as more reliable when fluctuation of the first measured values, and/or of an auxiliary measured variable of the first flow measuring transducer, does not exceed a pertinent fluctuation limit value.

9. The method as claimed in claim 8, wherein the auxiliary measured variable includes a density of the medium, or an eigenfrequency of an oscillatory mode of the mass flow measuring transducer, a viscosity of the medium, or a damping of at least one oscillatory mode and/or a signal-noise ratio of at least one oscillation sensor signal of the mass flow measuring transducer.

10. A measuring station, comprising:
a first flow measuring transducer that works according to a first measuring principle;
a second flow measuring transducer that works according to a second measuring principle; and
an operating- and evaluating circuit, configured to:
ascertain a contribution to the flowed amount based on the first measured values when these are more reliable;
ascertain a contribution to the flowed amount based on the second measured values when these are more reliable, wherein the contribution to the flowed amount corresponding to the second measured values is ascertained based on the second measured values by means of a version of a transfer function valid when ascertaining the second measured values;
update the transfer function when the measured values of the first flow measuring transducer are more reliable, wherein the updating includes empirically determining a constant C1, wherein the transfer function is proportional to the constant C1, and wherein the transfer function is further proportional to a first term of the form $|dp|^{1/C3}$ wherein dp is a measured pressure difference and C3 is a constant having a value between 1.5 and 2.5; and
correct as a function of the updated transfer function the contribution to the flowed amount earlier ascertained based on the second measured values.

11. A method for determining a flowed amount of a flowable medium that has flowed through a measuring station, wherein the measuring station includes:
a first flow measuring transducer that works according to a first measuring principle; and
a second flow measuring transducer that works according to a second measuring principle,
wherein the two flow measuring transducers are adapted, in each case, to be exposed to the total flowed amount of the medium,
wherein the flowing medium has variable states or combinations of states that influence reliability of first measured values of the first flow measuring transducer differently than second measured values of the second flow measuring transducer,
wherein the first measured values of the first flow measuring transducer are more reliable in first states or combinations of states of the medium than the second measured values of the second flow measuring transducer, and the second measured values of the second flow measuring transducer are more reliable in second states or combinations of states of the medium than the first measured values of the first flow measuring transducer,
the method comprising:
ascertaining a contribution to the flowed amount based on the first measured values when these are more reliable;
ascertaining a contribution to the flowed amount based on the second measured values when these are more reliable, wherein the contribution to the flowed amount corresponding to the second measured values is ascertained based on the second measured values via a version of a transfer function valid when ascertaining the second measured values;
updating the transfer function when the measured values of the first flow measuring transducer are more reliable, wherein the updating includes empirically determining a constant C1, wherein the transfer function F is proportional to the constant C1 and the transfer function F has the form $$F(dp, T) = C1\ G(dp)\ H(T)\text{ or}$$

$$F(dp, T) = C1\ G(dp, T),$$

wherein dp is a measured pressure difference, and G and H are functions of dp and/or T; and
correcting as a function of the updated transfer function the contribution to the flowed amount earlier ascertained based on the second measured values.

12. The method as claimed in claim 11 wherein the transfer function F has the form $$F(dp, T) = C1\ dp^{1/C2} \exp(C3\ T)\text{ or}$$

$$F(dp, T) = C1\ dp^{1/C2} \exp(-C3/T),$$

wherein C1, C2, C3 are positive constants.

* * * * *